(12) United States Patent
Walter et al.

(10) Patent No.: US 12,420,633 B2
(45) Date of Patent: Sep. 23, 2025

(54) PEDAL UNIT FOR A VEHICLE

(71) Applicant: Robert Bosch GmbH, Stuttgart (DE)

(72) Inventors: Heiko Walter, Untergruppenbach (DE);
Christoph Diekmann, Besigheim (DE);
David Volkmer, Marbach Am Neckar (DE); Marcel Bastian, Tamm (DE);
Maximilian Bayer, Tamm (DE);
Michael Hofmann, Mannheim (DE);
Philipp Seibold, Fellbach (DE);
Sebastian Stolz, Neckarwestheim (DE);
Thorsten Maucher, Neckarwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 18/496,506

(22) Filed: Oct. 27, 2023

(65) Prior Publication Data
US 2024/0174081 A1    May 30, 2024

(30) Foreign Application Priority Data

Nov. 29, 2022   (DE) .................... 10 2022 212 761.7

(51) Int. Cl.
| | |
|---|---|
| *B60K 26/02* | (2006.01) |
| *B60T 7/04* | (2006.01) |
| *G05G 1/30* | (2008.04) |
| *G05G 1/38* | (2008.04) |
| *G05G 5/03* | (2008.04) |

(52) U.S. Cl.
CPC .............. *B60K 26/02* (2013.01); *B60T 7/042* (2013.01); *G05G 1/305* (2013.01); *G05G 1/38* (2013.01); *G05G 5/03* (2013.01); *B60Y 2400/301* (2013.01); *G05G 2505/00* (2013.01)

(58) Field of Classification Search
None
See application file for complete search history.

(56) References Cited

U.S. PATENT DOCUMENTS

| | | | |
|---|---|---|---|
| 2013/0074634 A1* | 3/2013 | Abu Al-Rubb | B60K 26/02 74/480 R |
| 2019/0064870 A1* | 2/2019 | Krehl | G05G 5/03 |
| 2019/0100137 A1* | 4/2019 | Wolf-Monheim | B60T 17/22 |

FOREIGN PATENT DOCUMENTS

| | | |
|---|---|---|
| DE | 102 39 913 A1 | 3/2004 |
| DE | 103 12 547 A1 | 10/2004 |
| DE | 10 2017 217 578 A1 | 4/2019 |

* cited by examiner

*Primary Examiner* — Lail A Kleinman
(74) *Attorney, Agent, or Firm* — Maginot, Moore & Beck LLP

(57) ABSTRACT

A pedal unit for a vehicle has a sensor surface which includes at least two functional regions and is designed to detect an actuation by the driver. The pedal unit also has at least one evaluation and control unit coupled to the sensor surface and designed to evaluate an actuation of one of the at least two functional regions detected by the sensor surface and, as a function of this evaluation, control a vehicle function associated with the corresponding functional region of the sensor surface. At least one region of the sensor surface is raised or lowered and enables a haptic differentiation between the at least two functional regions of the sensor surface.

13 Claims, 2 Drawing Sheets

PEDAL UNIT FOR A VEHICLE

This application claims priority under 35 U.S.C. § 119 to application no. DE 10 2022 212 761.7, filed on Nov. 29, 2022 in Germany, the disclosure of which is incorporated herein by reference in its entirety.

The disclosure relates to a pedal unit for a vehicle.

BACKGROUND

Conventional pedal units for vehicles are typically designed in a travel-based manner. In particular in vehicle brake systems, hydraulic pressure is built up in the brake system on the basis of the pedal travel and a mechanical intervention. In other words, a respective driver braking request is associated with a specific pedal travel. This pedal travel for building up pressure, including an additional reserve travel for a backup case, defines the installation space provided for such pedal units in the vehicle interior.

Also known from the prior art are what are referred to as drive-by-wire systems, which transmit driver commands only electrically or electronically. Known examples of such drive-by-wire systems comprise an electronic accelerator pedal for drive control, a brake-by-wire system for brake control or a steer-by-wire system for steering control. Drive-by-wire refers to driving or controlling a vehicle without mechanical transmission of power from control elements, such as the accelerator pedal, brake pedal or steering wheel, to the corresponding actuating elements of the vehicle, such as the throttle, brakes and/or steering of the vehicle. In other words, in such drive-by-wire systems, the corresponding pedal unit is decoupled from the power flow, and the aforementioned functions are instead controlled via electrical lines and servo motors or electromechanical actuators. Driver actuation of a corresponding pedal unit can, e.g., be detected by a force-sensitive sensor surface and transmitted electrically to the corresponding vehicle system. Eliminating the mechanical connection makes it possible to implement new pedal concepts, because there is no longer a need for pedal travel to achieve vehicle deceleration.

An actuating means for influencing a brake, clutch or drive system of a motor vehicle is known from DE 102 39 913 A1, in which the actuating means actuated by a driver is mechanically decoupled from the actuators of the system. The actuating means in this case is a transducer that detects only the driver's actuating force and generates a control signal, the generation of which is independent of an actuation path and does not have an actuation path.

A device for accelerating or decelerating a motor vehicle comprising two actuating elements is known from DE 103 12 547 A1, in which the first actuating element is used to accelerate the motor vehicle and the second actuating element is used to decelerate the motor vehicle and the actuation of said actuating elements is effected by applying a hand or foot force. The operation of the two actuating elements is largely without travel, and the speed of the motor vehicle is kept constant after the hand or foot force is removed from the first actuating element or from the second actuating element as a function of the most recently applied hand or foot force until the first actuating element or the second actuating element are actuated again.

A method for operating a brake pedal unit of a vehicle with feedback to a driver is known from DE 10 2017 217 578 A1. The brake pedal unit comprises a plurality of pressure-sensitive or force-sensitive sensors. In the method, output signals of the plurality of pressure-sensitive or force-sensitive sensors are detected; at least one position and/or orientation of the operator's foot relative to the foot support element is determined from the detected output signals; and a feedback signal that characterizes the determined position and/or orientation is output at an output unit of the vehicle.

SUMMARY

The pedal unit for a vehicle having the features disclosed herein has the advantage that at least two functional regions of a sensor surface can be intuitively distinguished by the driver of the vehicle. Moreover, in embodiments of the pedal unit according to the disclosure, the use of the sensor surface to detect actuation by the driver advantageously eliminates the need to evaluate the pedal travel.

According to the disclosure, at least one region of the sensor surface can be raised or lowered. As a result, the driver is able to clearly and intuitively distinguish the at least two functional regions of the sensor surface. The elimination of the pedal travel furthermore results in an advantage in terms of installation space, because there is no longer a need to accommodate said travel in the footwell.

Embodiments disclosed herein provide a pedal unit for a vehicle, having a sensor surface which comprises at least two functional regions and is designed to detect an actuation by the driver, and having at least one evaluation and control unit which is coupled to said sensor surface and is designed to evaluate an actuation of one of the at least two functional regions detected by the sensor surface and, as a function of this evaluation, control a vehicle function associated with the corresponding functional region of the sensor surface. At least one region of the sensor surface here is raised or lowered and enables a haptic differentiation between the at least two functional regions of the sensor surface.

The sensor surface can in this context be understood as a device that associates a force applied, e.g., by the driver with a signal, using which at least one vehicle function, such as an acceleration and/or a deceleration of the vehicle, can be controlled. Other suitable sensor technologies, such as capacitive or optical sensors, etc., can also be used to detect an actuation of the sensor surface or pedal unit.

The at least one evaluation and control unit can in this context be understood as an electrical circuit that processes or evaluates detected sensor signals. The evaluation and control unit can comprise at least one interface, which can be implemented as hardware and/or software. When implemented as hardware, the interfaces can, e.g., be part of what is referred to as an ASIC system, which contains various functions of the evaluation and control unit. However, it is also possible that the interfaces be dedicated integrated circuits or consist at least partly of discrete components. When implemented as software, the interfaces can, e.g., be software modules present on a microcontroller alongside other software modules. Also advantageous is a computer program product comprising program code that is stored on a machine-readable carrier, e.g., a semiconductor memory, a hard disk memory, or an optical memory and is used to implement the evaluation when the program is executed by the evaluation and control unit.

It is particularly advantageous that a first functional region of the sensor surface can be associated with a braking function as a first vehicle function. In addition, a second functional region of the sensor surface can be associated with an acceleration function as a second vehicle function. The sensor surface can thus be used to control the acceleration and deceleration of the vehicle. The at least one raised or lowered region of the sensor surface helps the driver to clearly distinguish the first functional region for performing the acceleration function from the second functional region for performing the braking function.

In one advantageous embodiment of the pedal unit, a resting region can be arranged between the first functional region of the sensor surface and the second functional region of the sensor surface. The driver can place their foot on this resting region when neither the first vehicle function nor the second vehicle function is to be performed.

In another advantageous embodiment of the pedal unit, the at least one region of the sensor surface can be designed to be raised from a resting position to an operating position and lowered from the operating position to the resting position. Alternatively, the at least one region of the sensor surface can be designed to be lowered from the resting position to the operating position and raised from the operating position to the resting position. A further alternative embodiment of the sensor surface can moreover comprise regions which are raised from the resting position to the operating position and lowered from the operating position to the resting position, as well as regions which are lowered from the resting position to the operating position and raised from the operating position to the resting position.

In another advantageous embodiment of the pedal unit, the at least one evaluation and control unit can further be designed to raise or lower the at least one raisable or lowerable region of the sensor surface as a function of a current driving operation mode. The at least one evaluation and control unit can thus bring the at least one raisable or lowerable region of the sensor surface to its resting position without driver involvement, for example in an autonomous driving operation of the vehicle, so that the sensor surface is flat and the feeling of spaciousness can be increased. When the vehicle is being driven with driver involvement, the at least one evaluation and control unit can bring the at least one raisable or lowerable region of the sensor surface to its operating position, so that an intuitive differentiation between the at least two functional regions of the sensor surface is possible.

In another advantageous embodiment of the pedal unit, the at least one evaluation and control unit can further be designed to control at least one actuator which raises or lowers the at least one raisable or lowerable region of the sensor surface. The at least one raisable or lowerable region of the sensor surface can, e.g., be designed as an inflatable cushion or as an extendable bar or as an extendable frame. The height and inclination of the at least one raisable or lowerable region of the sensor surface in the operating position can be customized and adapted to the end user.

In another advantageous embodiment of the pedal unit, the at least one raised or lowered region of the sensor surface can form at least part of at least one of the at least two functional regions of the sensor surface. The at least one raised or lowered region of the sensor surface can be arranged on at least one edge of a corresponding functional region of the sensor surface. Alternatively, the at least one raised or lowered region of the sensor surface can form a corresponding functional region of the sensor surface.

In another advantageous embodiment of the pedal unit, the at least one raised or lowered region of the sensor surface can be arranged between the at least two functional regions of the sensor surface. This enables a particularly reliable differentiation between two adjacent functional regions. Preferably, the at least one raised or lowered region of the sensor surface can form the resting region between two functional regions.

BRIEF DESCRIPTION OF THE DRAWINGS

Exemplary embodiments of the disclosure are shown in the drawings and explained in more detail in the following description. In the drawings, the same reference signs designate components or elements that perform the same or similar functions.

DETAILED DESCRIPTION

Figure 1:
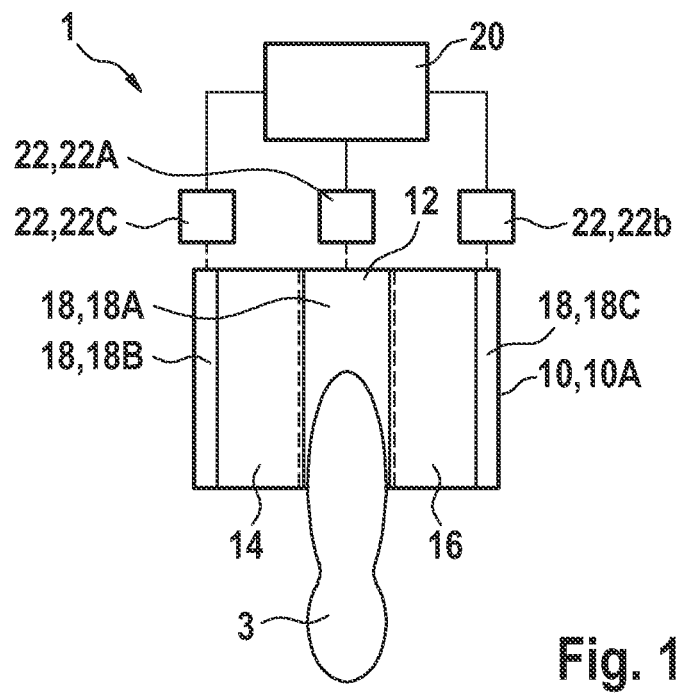
FIG. 1 a schematic illustration of an exemplary embodiment of the pedal unit for a vehicle according to the disclosure.
Figure 2:
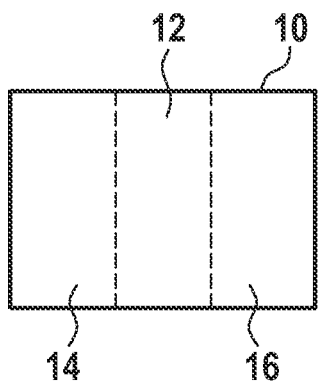
FIG. 2 shows a schematic illustration of an exemplary embodiment of a sensor surface of the pedal unit according to the disclosure of FIG. 1, with two functional regions and a resting region.

As seen in FIG. 1, the shown exemplary embodiment of a pedal unit 1 according to the disclosure for a vehicle has a sensor surface 10 which comprises at least two functional regions 14, 16, and detects an actuation by the driver, and has at least one evaluation and control unit 20 which is coupled to the sensor surface 10 and evaluates an actuation of one of the at least two functional regions 14, 16 detected by the sensor surface 10 and, as a function of this evaluation, controls a vehicle function associated with the corresponding functional region 14, 16 of the sensor surface 10. At least one region 18 of the sensor surface 10 is raised or lowered and enables a haptic differentiation between the at least two functional regions 14, 16 of the sensor surface 10.

As further seen in FIGS. 1 to 7, the sensor surface 10, 10A, 10B, 10C, 10D, 10E in the shown exemplary embodiments each comprises two functional regions 14, 16 and a resting region 12, which is arranged between a first functional region 14 of the sensor surface 10 and a second functional region 16. The first functional region 14 of the sensor surface 10, 10A, 10B, 10C, 10D, 10E in the shown exemplary embodiment of the pedal unit 1 is associated with a braking function as a first vehicle function. The second functional region 16 of the sensor surface 10, 10A, 10B, 10C, 10D, 10E is associated with an acceleration function as a second vehicle function.

In the shown exemplary embodiments of the sensor surface 10, 10A, 10B, 10C, 10D, 10E of the pedal unit 1, the at least one region 18 of the sensor surface 10, 10A, 10B, 10C, 10D, 10E is raised from a resting position to an operating position and lowered from the operating position to the resting position.

In alternative exemplary embodiments of the sensor surface 10 of the pedal unit 1 (not depicted), the at least one region 18 of the sensor surface 10 is lowered from the resting position to the operating position and raised from the operating position to the resting position.

In other alternative, exemplary embodiments of the sensor surface 10 of the pedal unit 1 (not depicted), at least one first region 18 of the sensor surface 10 is lowered from the resting position to the operating position and raised from the operating position to the resting position, and at least one second region 18 of the sensor surface 10 is raised from a resting position to an operating position and lowered from the operating position to the resting position.

In the shown exemplary embodiment of the pedal unit 1, the at least one evaluation and control unit 20 additionally moves the at least one raisable or lowerable region 18 of the sensor surface 10 as a function of a current driving operation mode. The at least one evaluation and control unit 20 thus brings the at least one raisable or lowerable region 18 of the sensor surface 10, 10A, 10B, 10C, 10D, 10E to its resting position without driver involvement in an autonomous driving operation of the vehicle. When the vehicle is being driven with driver involvement, the at least one evaluation and control unit 20 brings the at least one raisable or lowerable region 18 of the sensor surface 10 to its operating position and enables an intuitive differentiation between the at least two functional regions 14, 16 of the sensor surface 10.

As further seen in FIG. 1, for moving the at least one raisable or lowerable region 18 of the sensor surface 10, the pedal unit 1 comprises at least one actuator 22 which is controlled by the at least one evaluation and control unit 20 and raises or lowers the at least one raisable or lowerable region 18 of the sensor surface 10.

Figure 3:
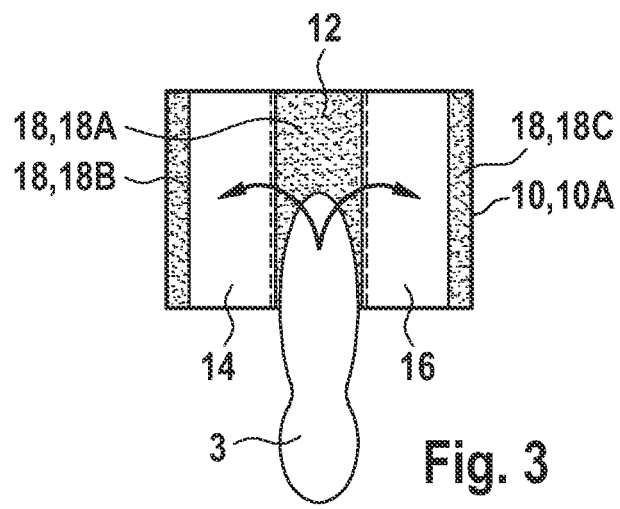
FIG. 3 to FIG. 7 show different exemplary embodiments of at least one raisable or lowerable region of the sensor surface in FIGS. 1 and 2.

As further seen in FIGS. 1 and 3, the shown first exemplary embodiment of the sensor surface 10A comprises three raisable or lowerable regions 18A, 18B, 18C. In the shown exemplary embodiment, the pedal unit 1 also comprises three actuators 22 which are each coupled to a raisable or lowerable region 18A, 18B, 18C of the sensor surface 10. A first actuator 22A is coupled to a first raisable or lowerable region 18A. A second actuator 22B is coupled to a second raisable or lowerable region 18B, and a third actuator 22C is coupled to a third raisable or lowerable region 18C.

As further seen in FIGS. 1 and 3, the first raisable or lowerable region 18A of the sensor surface 10A is arranged between the two functional regions 14, 16 of the sensor surface 10A and forms the resting region 12 of the sensor surface 10A. The first raisable or lowerable region 18A is designed as an inflatable cushion. As further seen in FIGS. 1 and 3, the second raisable or lowerable region 18B forms at least part of the first functional region 14 of the sensor surface 10A and is arranged on a left edge of the corresponding first functional region 14 of the sensor surface 10A. The third raisable or lowerable region 18C forms at least part of the second functional region 16 of the sensor surface 10A and is arranged on a right edge of the corresponding second functional region 16 of the sensor surface 10A. The second raisable or lowerable region 18B and the third raisable or lowerable region 18C of the sensor surface 10A are respectively designed as an extendable bar in the shown exemplary embodiment. The first raisable or lowerable region 18A helps the driver intuitively locate the resting region 12 of the sensor surface 10A. To locate the first functional region 14, the driver can orient themselves on the second raisable or lowerable region 18B. To locate the second functional region 14, the driver can orient themselves on the third raisable or lowerable region 18C.

Figure 4:
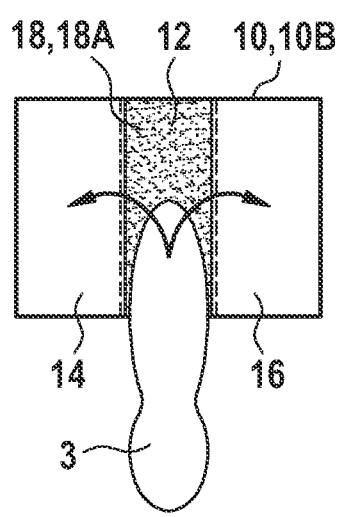

As further seen in FIG. 4, in contrast to the first exemplary embodiment, the shown second exemplary embodiment of the sensor surface 10B comprises only the first raisable or lowerable region 18A of the sensor surface 10B, which is arranged between the two functional regions 14, 16 of the sensor surface 10B and forms the resting region 12 of the sensor surface 10B. As in the first exemplary embodiment, the first raisable or lowerable region 18A is designed as an inflatable cushion. The first raisable or lowerable region 18A helps the driver intuitively locate the resting region 12 of the sensor surface 10B.

Figure 5:
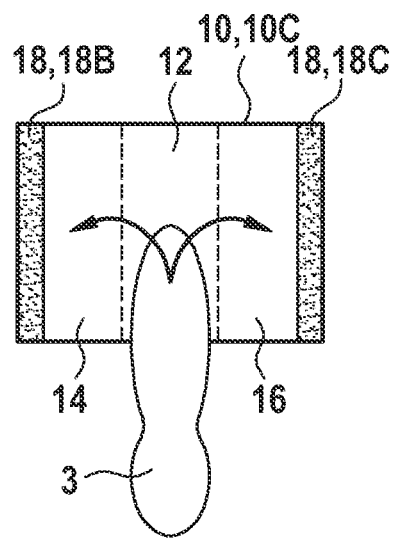

As further seen in FIG. 5, in contrast to the first embodiment, the shown third exemplary embodiment of the sensor surface 10C comprises the second raisable or lowerable region 18B, which forms at least part of the first functional region 14 of the sensor surface 10A and is arranged on the left edge of the corresponding first functional region 14 of the sensor surface 10A, and the third raisable or lowerable region 18C, which forms at least part of the second functional region 16 of the sensor surface 10C and is arranged on the right edge of the corresponding second functional region 16 of the sensor surface 10C. As in the first exemplary embodiment, the second raisable or lowerable region 18B and the third raisable or lowerable region 18C of the sensor surface 10C are respectively designed as an extendable bar. To locate the first functional region 14 of the sensor surface 10C, the driver can orient themselves on the second raisable or lowerable region 18B. To locate the second functional region 14 of the sensor surface 10C, the driver can orient themselves on the third raisable or lowerable region 18C.

Figure 6:
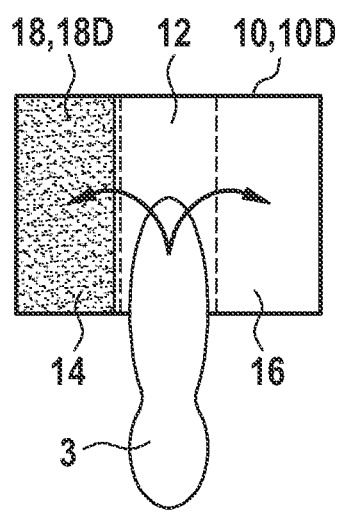

As further seen in FIG. 6, in contrast to the other exemplary embodiments, the shown fourth exemplary embodiment of the sensor surface 10D comprises a fourth raisable or lowerable region 18D of the sensor surface 10D, which forms the first functional region 14 of the sensor surface 10D. The fourth raisable or lowerable region 18D is designed as an inflatable cushion, like the first raisable or lowerable region 18A. The fourth raisable or lowerable region 18D helps the driver intuitively locate the first functional region 14 of the sensor surface 10D.

Figure 7:
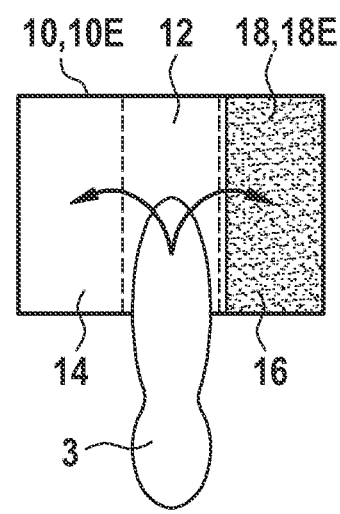

As further seen in FIG. 7, in contrast to the other exemplary embodiments, the shown fifth exemplary embodiment of the sensor surface 10E comprises a fifth raisable or lowerable region 18E of the sensor surface 10E, which forms the first functional region 16 of the sensor surface 10E. The fifth raisable or lowerable region 18E is designed as an inflatable cushion, like the first raisable or lowerable region 18A and the fourth raisable or lowerable region 18D. The fifth raisable or lowerable region 18E helps the driver intuitively locate the second functional region 16 of the sensor surface 10E.

The illustrations show a foot 3 of the driver resting on the resting region 12. The foot can be moved in accordance with the directional arrows to the left onto the first functional region 14 to perform the braking function or to the right onto the second functional region 16 to perform the acceleration function.

The invention claimed is:
1. A pedal unit for a vehicle, comprising:
a sensor surface which comprises at least two functional regions and is configured to detect an actuation by a driver; and
at least one evaluation and control unit coupled to said sensor surface and configured to evaluate an actuation of one of the at least two functional regions detected by the sensor surface and, as a function of the evaluation, control a vehicle function associated with the corresponding functional region of the sensor surface,
wherein at least one region of the sensor surface is raised or lowered and enables a haptic differentiation between the at least two functional regions of the sensor surface.
2. The pedal unit according to claim 1, wherein a first functional region of the at least two functional regions of the sensor surface is associated with a braking function as a first vehicle function.
3. The pedal unit according to claim 1, wherein a second functional region of the at least two functional regions of the sensor surface is associated with an acceleration function as a second vehicle function.
4. The pedal unit according to claim 2, wherein a second functional region of the at least two functional regions of the sensor surface is associated with an acceleration function as a second vehicle function, and a resting region is arranged between the first functional region and the second functional region.

5. The pedal unit according to claim 1, wherein the at least one region is configured to be raised from a resting position to an operating position and lowered from the operating position to the resting position.

6. The pedal unit according to claim 1, wherein the at least one region is configured to be lowered from a resting position to an operating position and raised from the operating position to the resting position.

7. The pedal unit according to claim 1, wherein:
the at least one region is configured to be raised from a resting position to an operating position and lowered from the operating position to the resting position, or the at least one region is configured to be lowered from the resting position to the operating position and raised from the operating position to the resting position, and
the at least one evaluation and control unit is further configured to raise or lower the at least one region of the sensor surface as a function of a current driving operation mode.

8. The pedal unit according to claim 7, wherein the evaluation and control unit is further designed to control at least one actuator which raises or lowers the at least one raisable or lowerable region of the sensor surface.

9. The pedal unit according to claim 1, wherein:
the at least one region is configured to be raised from a resting position to an operating position and lowered from the operating position to the resting position, or the at least one region is configured to be lowered from the resting position to the operating position and raised from the operating position to the resting position, and
the at least one raisable or lowerable region of the sensor surface is configured as an inflatable cushion, an extendable bar, or an extendable frame.

10. The pedal unit according to claim 1, wherein the at least one raised or lowered region of the sensor surface forms at least part of at least one of the at least two functional regions of the sensor surface.

11. The pedal unit according to claim 10, wherein the at least one raised or lowered region of the sensor surface is arranged on at least one edge of the at least one of the at least two functional regions of the sensor surface.

12. The pedal unit according to claim 10, wherein the at least one raised or lowered region of the sensor surface forms the at least one of the at least two functional regions of the sensor surface.

13. The pedal unit according to claim 1, wherein the at least one raised or lowered region of the sensor surface is arranged between the at least two functional regions of the sensor surface.

* * * * *